United States Patent
Plank

(10) Patent No.: US 11,147,284 B2
(45) Date of Patent: Oct. 19, 2021

(54) METHODS AND COMPOSITIONS FOR REDUCING OIL SEPARATION IN NUT BUTTERS

(71) Applicant: Nut Butter Concepts, LLC, Simi Valley, CA (US)

(72) Inventor: David Plank, Simi Valley, CA (US)

(73) Assignee: NUT BUTTER CONCEPTS, LLC, Simi Valley, CA (US)

( * ) Notice: Subject to any disclaimer, the term of this patent is extended or adjusted under 35 U.S.C. 154(b) by 134 days.

(21) Appl. No.: 16/417,340

(22) Filed: May 20, 2019

(65) Prior Publication Data

US 2019/0320675 A1 Oct. 24, 2019

(51) Int. Cl.

| A23D 9/007 | (2006.01) |
|---|---|
| A23L 27/28 | (2016.01) |
| A23L 27/40 | (2016.01) |
| A23L 25/00 | (2016.01) |
| A23L 33/105 | (2016.01) |
| A23L 25/10 | (2016.01) |

(52) U.S. Cl.
CPC .............. *A23D 9/007* (2013.01); *A23L 25/10* (2016.08); *A23L 25/30* (2016.08); *A23L 27/28* (2016.08); *A23L 27/40* (2016.08); *A23L 33/105* (2016.08); *A23V 2002/00* (2013.01); *A23V 2200/30* (2013.01); *A23V 2250/5058* (2013.01); *A23V 2250/5066* (2013.01)

(58) Field of Classification Search
CPC ......... A23D 9/007; A23L 25/30; A23L 27/40; A23L 33/105; A23L 27/28; A23V 2002/00
USPC ................................. 426/633, 573, 519, 632
See application file for complete search history.

(56) References Cited

U.S. PATENT DOCUMENTS

| 4,942,055 | A | 7/1990 | Avera |
| 5,324,531 | A | 6/1994 | Hoefler et al. |
| 6,773,744 | B1 * | 8/2004 | Ward et al. |
| 8,173,194 | B2 | 5/2012 | Thaler et al. |
| 8,906,441 | B2 | 12/2014 | Rajesh et al. |
| 9,554,591 | B2 | 1/2017 | Marangoni et al. |
| 2018/0295869 | A1 * | 10/2018 | Villa |

FOREIGN PATENT DOCUMENTS

| CN | 103815460 | * 5/2014 |
| CN | 107518364 | 12/2017 |
| CN | 108244265 | 7/2018 |
| CN | 108541926 | 9/2018 |
| WO | 2016057818 | 4/2016 |

OTHER PUBLICATIONS

Konjac Foods, 2017, The Low Carb thickener—Konjac Flour, pp. 1-9, http://konjacfoods.com/thickener.htm (Year: 2017).*
European Food Safety Authority, EFSA Journal 2010, Scientific Opinion on the substantiation of health claims related to konjac mannan (glucomannan).

* cited by examiner

*Primary Examiner* — Helen F Heggestad
(74) *Attorney, Agent, or Firm* — Kevin Shraven; Anooj Patel; Hankin Patent Law, APC

(57) ABSTRACT

A composition and method for manufacturing nut butters that are resistant to oil separation. The composition may comprise one or more nut butters, konjac fiber, water, a secondary fat, and flavorings. The ingredients are preferably blended via low-shear mixing. The konjac fiber may be derived from corm konjac and may also take the form of a konjac flour.

20 Claims, 6 Drawing Sheets

METHODS AND COMPOSITIONS FOR REDUCING OIL SEPARATION IN NUT BUTTERS

FIELD OF USE

The present disclosure relates generally to methods and compositions for reducing oil separation in nut butters. More particularly, the present disclosure relates to methods for increasing the viscosity of a nut butter composition by adding certain dietary fibers, and thereby reducing or preventing the separation of oil from the nut butter solids.

BACKGROUND

Currently, commercially available products made with oil-containing plant ingredients such as drupe, seed, nut, grain, legume, pulse, vegetable, and fruit butters or oils are generally subject to having their oil content separated from their solids content when stored for any extended period of time. This separation is a significant issue for manufacturers and consumers because not only is it not visually appealing, but it can also be very difficult for consumer to mix the components back together. When a consumer is forced to manually re-mix a separated product, it can lead to spillage and pockets of the nut butter that do not contain the ideal ratio of oil to solid. As such, the partially mixed result can have an unpleasant texture and simply not taste as good. The negatives associated with the need to re-mix such a product has a definitive impact on the consumer's desire to purchase that product.

Although there have been industry attempts to solve this problem, they are deficient and generally unacceptable to health-conscious consumers. For example, some of these previous solutions use partially hydrogenated fats, palm oils, and/or emulsifiers. The negative impacts of these current methods include an increase in trans-fat consumption when using partially hydrogenated oils, negative impacts on cardiovascular health when using palm oils, and negative impacts on the gut flora is linked with the consumption of emulsifiers. These negatives substantially may cause consumers to negatively view the particular products.

Thus, what is needed is a new method for preventing the separation of oils and solids in nut butters in a manner that not only avoids the negatives of current methods, but also enhances the nutritional profile of the product.

SUMMARY OF EMBODIMENTS

To minimize the limitations in the prior art, and to minimize other limitations that will become apparent upon reading and understanding the present specification, the following discloses a new and improved method and composition of nut butter that is both health-conscious and resistant to separation.

The compound of the present disclosure may form a network that creates stable, but reversible, hydrogen, ionic and hydrophobic bonds between fat, protein, water and carbohydrates (e.g. dietary fiber). This has been shown in testing to be effective in preventing oil separation in nut butters and products of similar oil containing properties. Once formed, such a network may result in the product having an increased viscosity due to the greater immobility and resistance of the network's components. In order to create the aforementioned network with the concomitant viscosity increase, and therefore decrease the likelihood of separation, of the product, a combination of konjac fiber, water, and (optionally) a small amount of a second fat are added to the nut butter mixture. The result is a nut butter that does resists separation and remains shelf stable longer than current nut butter compositions. Additionally, due to the konjac fiber content, the resulting nut butter has higher dietary fiber, the consumption of which is correlated with better health outcomes.

One embodiment of the present disclosure may be a composition comprising:
 a nut butter, which may be any ground drupe, seed, nut, grain, legume, pulse, vegetable, fruit, and/or plant matter;
 Konjac fiber
 Water
 (and optionally) Secondary fat, which may be selected from one or more of the following: cacao butter, cocoa butter, shea nut butter, coconut oil, medium-chain triglycerides, palm oil, palm kernel oil, lard, beef tallow, high-stearic acid vegetable oils, high-palmitic acid vegetable oils, high-behenic acid vegetable oils, hydrogenated vegetable oils, inter- or intra-esterified fats and oils.

One embodiment may be a nut butter composition comprising nut butter, glucomannan, and water. Optionally, some compositions may further comprise a low amount of natural, sustainably sourced fat with appropriate melt and organoleptic characteristics (e.g. cacao butter). The compositions of the present disclosure may be manufactured nut butters under low shear mixing conditions, which further ensures a nut butter composition that does not significantly separate during storage. The resulting nut butter, as preferred, has a higher viscosity than the starting nut butter which does not contain the additives. Moreover, because the konjac fiber added is a dietary fiber that confers positive physiological benefits to the consumer, the nut butter of the present disclosure is significantly improved in its nutritional health profile. The compositions of the present disclosure also still taste very good.

One embodiment may be a composition, comprising: one or more nut butters; konjac; and water. The konjac used may be made from a corm of the konjac. In various embodiments the konjac corm may be made into a konjac flour or konjac fiber, either of which may be used. The konjac used may preferably be 70% glucomannan. The composition may further comprise one or more secondary fats, such as cocoa butter. The composition may further comprise one or more of salt, vanilla, cocoa powder, and combinations thereof. The composition may be blended using low-shear mixing, where in either the water or konjac is blended with the nut butter before the other.

Another embodiment may be a composition, comprising: one or more nut butters in a range of approximately 1.0-99.8% by weight; a konjac fiber in a range of approximately 0.1-70.0% by weight; and water in a range of approximately 0.1-25.0% by weight. The konjac fiber may be at least 70% glucomannan. Alternatively, the konjac fiber is at least 95% glucomannan. The composition may further comprise one or more secondary fats, such as cocoa butter in a range of approximately 0.0 to 25.0% by weight. The composition may further comprise one or more of salt, vanilla, cocoa powder, and combinations thereof. The composition may be blended using low-shear mixing, where in either the water or konjac is blended with the nut butter before the other.

Another embodiment may be a composition, comprising: one or more nut butters in a range of approximately 70.0-95.0% by weight; a konjac fiber in a range of approximately 1.0-10.0% by weight; and water in a range of approximately 1.0-10.0% by weight; wherein the konjac fiber is blended with the one or more nut butters via low-shear mixing before the water is added. The composition may further comprise cocoa butter in a range of approximately 1.0 to 10.0% by weight.

Additional embodiments will be understood from the detailed description below.

BRIEF DESCRIPTION OF THE DRAWINGS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION

Figure 1:
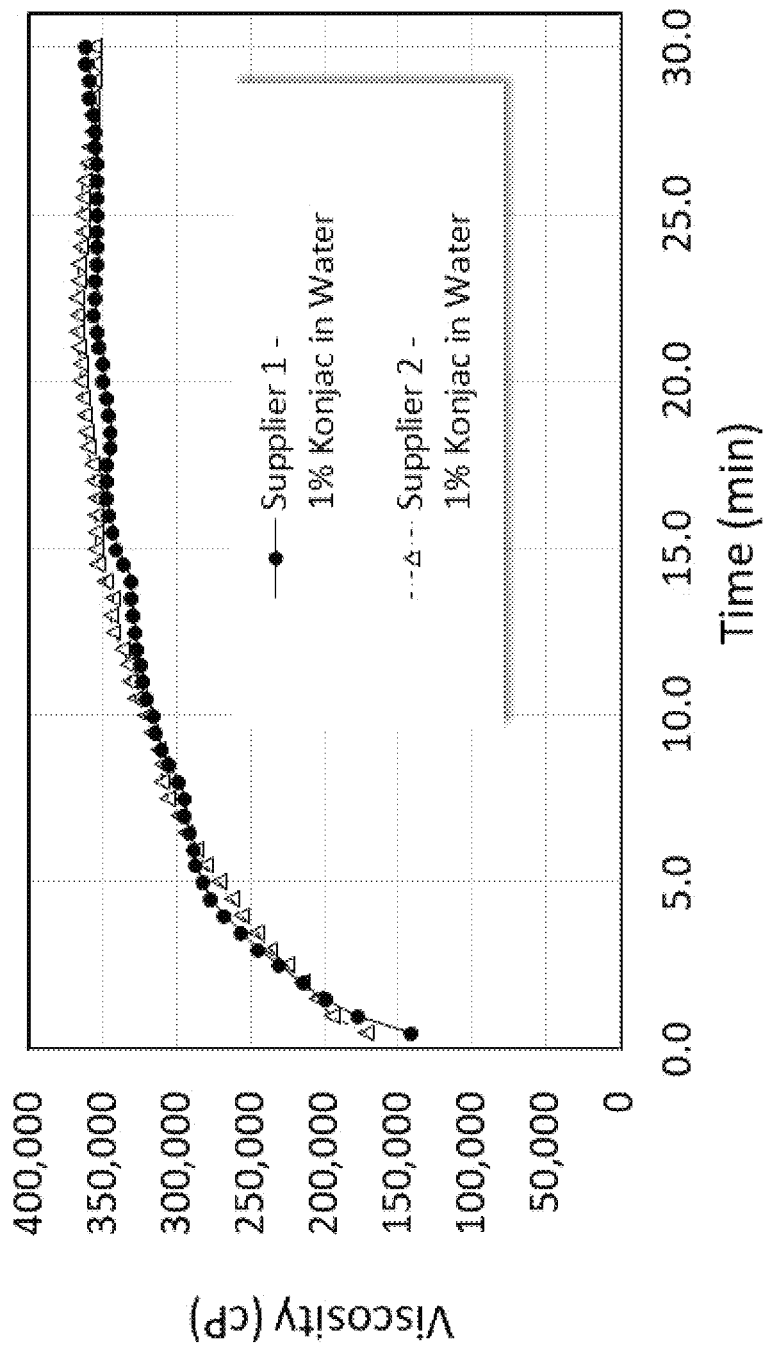
FIG. 1 is graph that shows one example of viscometric properties common to konjac glucomannans.

In the following detailed description numerous specific details are set forth in order to provide a thorough understanding of various aspects of one or more embodiments. However, the one or more embodiments may be practiced without some or all of these specific details. In other instances, well-known methods, procedures, and/or components have not been described in detail so as not to unnecessarily obscure aspects of the embodiments.

While multiple embodiments are disclosed, still other embodiments of the present disclosure will become apparent to those skilled in the art from the following detailed description. As will be realized, the embodiments are capable of modifications in various obvious aspects, all without departing from the spirit and scope of protection. Also, the reference or non-reference to a particular embodiment shall not be interpreted to limit the scope of protection.

Definitions

In the following description, certain terminology is used to describe certain features of one or more embodiments. For example, the term "cacao butter" generally refers to a vegetable fat which is cold expeller pressed from cacao beans and is classified as a raw food. Whereas "cocoa butter" is a vegetable fat extracted from cacao beans at a wide range of higher temperatures depending on the manufacturer.

As used herein, the term "nut butter" generally refers to a plant-based material that has been ground into a paste. The grind may be fine, course, and all levels in between. The plant-based material may be at least one of: drupe, seed, tree nut (specifically including almonds), nut grain, legume (specifically including peanuts), pulse, vegetable, fruit, stalk, and combinations thereof. The consistency and viscosity of the nut butter may depend on the grind and one or more of the fat content, fiber content, and protein content of the underlying plant-based material.

As used herein, the term "low-shear mixing" or "low-shear mix" refers to a method of blending substances without reducing the particle sizes during the process. Typically performed with a low tip speed on the agitator used for mixing.

As used herein, the term "substantially" generally refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", refer to a deviance of between 0.0001-10% from the indicated number or range of numbers.

Konjac

Konjac is the common name of the Asian plant *amorphophallus konjac* (syn. *A. rivieri*), which has an edible corm or bulbo-tuber. The konjac corm is used to make konjac glucomannan (also called konjac fiber) and konjac flour.

Manufacture of Konjac Flour and Konjac Fiber

Konjac flour may preferably be made from two-year-old konjac corms which are washed, sliced into thin chips, dried and then pulverized by dry or wet milling. The milling process enriches the konjac flour in glucomannan by removing the tachiko (protein, starches, cellulose, lignins, phenolics and other compounds) from the konjac flour. Konjac flour is comprised of approximately 70-90% glucomannan.

Konjac glucomannan or konjac fiber, the non-digestible, water-soluble polysaccharide that is a hemicellulose component in the *amorphophallus konjac* cell walls, may be obtained from konjac flour by washing the konjac flour with water-containing ethanol. By this washing procedure, microfine powders remaining on the surface and impurities trapped inside the konjac particles are removed. Konjac fiber, is at least 95% glucomannan. Because there is only a slight increase in glucomannan content in konjac flour compared to purified konjac fiber (a 5 to 25% difference) the terms "konjac flour", "konjac fiber", and "konjac glucomannan" are used interchangeably when discussing physiological efficacy by many researchers.

Konjac Fiber (Konjac Glucomannan)

Konjac fiber can vary significantly in molecular weight and viscosity-building capacity. The quality of konjac fiber may vary considerably between different suppliers, this may significantly affect the molecular weight and, thus, the viscosity. The overall molecular weight of the konjac glucomannan may be a direct function of the type of processing used in its isolation/purification. The final molecular weight and viscosity-building properties of any konjac glucomannan are, therefore, dependent on the degree of mechanical shear and chemical hydrolysis which may occur in a particular supplier's process. Because these factors are protected third-party trade secrets, they cannot be known or disclosed herein, but, they should be taken into consideration in producing the desired final product.

Konjac fiber is classified as a non-digestible carbohydrate by the dietary fiber method AOAC 2011.25 and has been shown to provide the physiological health benefits attributed to dietary fiber in numerous peer-reviewed clinical studies.

Glucomannan derived from *Amorphophallus konjac* is known to be composed of β-1,4 linked D-glucose and D-mannose residues typically in a ratio of 1.6 mannose to glucose. As β-1, 4 linkages cannot be hydrolyzed by human amylases, konjac glucomannan passes into the colon unchanged. The average DP (degree of polymerization) for konjac glucomannan is 6200 and molecular weight ranges from 200-2000 coda.

European Food Safety Authority (EFSA) Journal 2010; 8(10):1798, which is hereby incorporated by reference herein as though set forth in its entirety, is a Scientific Opinion that details the safety of, and legitimacy of health claims for, Konjac glucomannan.

Some of the scientifically proven and well known physiological benefits of konjac glucomannan include, but are not limited to, glucose response reduction, LDL cholesterol reduction, improved skin health, and weight loss. Regarding weight loss, a demonstrable cause and effect relationship has been established between the consumption of glucomannan and the reduction of body weight. Glucomannan is a soluble fiber that forms a viscous, gel-like mass in the stomach when hydrated, and that this "mass effect" could delay gastric emptying and induce satiety leading to a decrease in subsequent calorie intake.

In various embodiments, either konjac flour or konjac fiber may be used with the compositions and/or methods disclosed herein. Konjac fiber may be preferable due to the higher purity and less risk for introduction of off flavors. The examples disclosed herein contain formulations containing konjac that show viscosity builds that provide the needed functionality of the composition.

Viscometric Properties of Konjac

FIG. 1 is graph that shows one example of viscometric properties common to konjac fiber. Konjac fiber (>95% glucomannan), in powder form, from two different suppliers was slowly added to distilled water through the top of a rotor blade mixer spinning at level 4 of 10 over a 4 minute duration. After the final amount of konjac powder was added, the speed of the mixer is increased to level 10 for 1 minute. The solution is transferred to beaker and viscosity is monitored over a 30-minute time period using a Brookfield® model DV3T-HAT-JO, firmware v. 1.3.4-9, TK v. 1.0, spindle v. 1.0 equipped with an HA-03 spindle run at a speed of 0.30 rpm. The final mixtures were 1% konjac. FIG. 1 shows the curve of the increase in viscosity over time of the two konjac 1% preparations.

Table 1 shows the increase in viscosity in centipoise (cP) shown in FIG. 1

TABLE 1

| Time (min) | Viscosity (cP) Supplier 1 - 1% Konjac in Water | Viscosity (cP) Supplier 2 - 1% Konjac in Water |
|---|---|---|
| 0.5 | 140,700 | 172,000 |
| 1.0 | 176,700 | 194,700 |
| 1.5 | 199,300 | 204,700 |
| 2.0 | 214,700 | 216,000 |
| 2.5 | 230,700 | 225,300 |
| 3.0 | 244,700 | 237,300 |
| 3.5 | 256,700 | 246,000 |
| 4.0 | 268,000 | 256,700 |
| 4.5 | 276,700 | 263,300 |
| 5.0 | 282,000 | 272,000 |
| 5.5 | 286,700 | 280,700 |
| 6.0 | 288,000 | 287,300 |
| 6.5 | 291,300 | 294,700 |
| 7.0 | 294,700 | 299,300 |
| 7.5 | 294,700 | 306,000 |
| 8.0 | 299,300 | 310,000 |
| 8.5 | 305,300 | 310,700 |
| 9.0 | 310,000 | 312,700 |
| 9.5 | 314,000 | 318,000 |
| 10.0 | 316,000 | 322,000 |
| 10.5 | 320,000 | 328,000 |
| 11.0 | 322,700 | 332,000 |
| 11.5 | 324,700 | 333,300 |
| 12.0 | 327,300 | 336,700 |
| 12.5 | 328,700 | 343,300 |
| 13.0 | 330,000 | 344,700 |
| 13.5 | 331,300 | 343,300 |
| 14.0 | 331,300 | 348,700 |
| 14.5 | 335,300 | 353,300 |
| 15.0 | 340,700 | 354,700 |
| 15.5 | 343,300 | 354,700 |
| 16.0 | 346,000 | 355,300 |
| 16.5 | 348,000 | 355,300 |
| 17.0 | 348,000 | 356,000 |
| 17.5 | 347,300 | 358,000 |
| 18.0 | 345,300 | 360,700 |
| 18.5 | 345,300 | 362,000 |
| 19.0 | 346,000 | 363,300 |
| 19.5 | 348,000 | 364,000 |
| 20.0 | 350,000 | 364,700 |
| 20.5 | 350,000 | 364,700 |
| 21.0 | 352,000 | 366,700 |
| 21.5 | 353,300 | 367,300 |
| 22.0 | 356,000 | 367,300 |
| 22.5 | 355,300 | 367,300 |
| 23.0 | 354,700 | 366,700 |
| 23.5 | 354,000 | 366,000 |
| 24.0 | 354,000 | 364,700 |
| 24.5 | 353,300 | 364,000 |
| 25.0 | 354,000 | 364,000 |
| 25.5 | 353,300 | 364,000 |
| 26.0 | 354,000 | 363,300 |
| 26.5 | 354,000 | 360,700 |
| 27.0 | 355,300 | 359,300 |
| 27.5 | 355,300 | 357,300 |
| 28.0 | 356,700 | 357,300 |
| 28.5 | 358,700 | 357,300 |
| 29.0 | 359,300 | 356,700 |
| 29.5 | 361,300 | 356,000 |
| 30.0 | 362,000 | 356,000 |

FIG. 1 and Table 1 show that konjac fiber demonstrates the viscosity parameters that allow konjac to function as a substance that may form a network with water that resists or prevents oil separation in nut butters.

Figure 2:
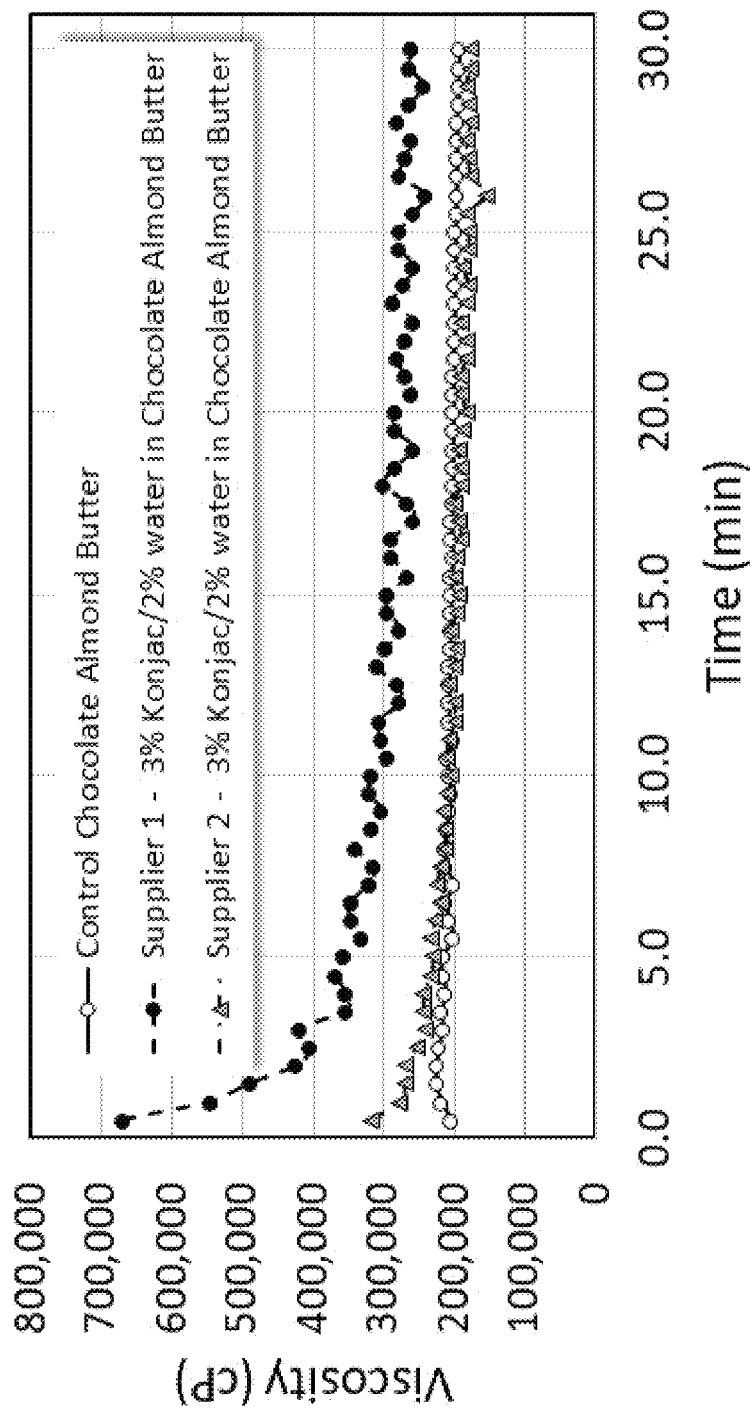
FIG. 2 is a graph that shows the viscometric properties of konjac fiber when mixed with a chocolate almond butter.

FIG. 2 is a graph that shows the viscometric properties of two different konjac fibers (konjac glucomannan) when mixed with a chocolate almond butter in which oil separation is prevented, reduced, or significantly delayed due to the presence of the konjac fiber and water. The viscosity of control chocolate almond butter without konjac fiber is shown for comparison. The konjac fiber was blended under low shear to homogeneity into the chocolate nut butter followed by addition of moisture, vanilla, and flavors with low shear mixing. The solution viscosity was monitored immediately post mixing over a 30-minute period of time using a Brookfield® model DV3T-HAT-JO, firmware v. 1.3.4-9, TK v. 1.0, spindle v. 1.0 equipped with an HA-06 spindle run at a speed of 0.60 rpm. Viscosity of the control chocolate nut butter was measured with the same instrument using an HA-03 spindle run at a speed of 0.5 rpm.

Table 2 shows the viscosity curve data in centipoise (cP) of the graph shown in FIG. 2

TABLE 2

| | Viscosity (cP) | | |
|---|---|---|---|
| Time (min) | Control Chocolate Almond Butter | Supplier 1 - 3% Konjac/2% water in Chocolate Almond Butter | Supplier 2 - 3% Konjac/2% water in Chocolate Almond Butter |
| 0.5 | 204,800 | 670,000 | 316,700 |
| 1.0 | 218,400 | 546,700 | 276,700 |
| 1.5 | 225,600 | 490,000 | 270,000 |
| 2.0 | 224,000 | 423,300 | 270,000 |
| 2.5 | 222,800 | 403,300 | 253,300 |
| 3.0 | 216,400 | 420,000 | 240,000 |
| 3.5 | 218,000 | 353,300 | 243,300 |
| 4.0 | 212,000 | 353,300 | 243,300 |
| 4.5 | 217,200 | 366,700 | 233,300 |
| 5.0 | 216,400 | 356,700 | 230,000 |
| 5.5 | 202,800 | 330,000 | 233,300 |
| 6.0 | 206,800 | 346,700 | 226,700 |
| 6.5 | 212,400 | 346,700 | 220,000 |
| 7.0 | 202,800 | 320,000 | 223,300 |
| 7.5 | 212,000 | 313,300 | 220,000 |
| 8.0 | 212,000 | 340,000 | 213,300 |
| 8.5 | 210,400 | 316,700 | 213,300 |
| 9.0 | 208,000 | 303,300 | 216,700 |
| 9.5 | 203,600 | 320,000 | 210,000 |
| 10.0 | 208,800 | 316,700 | 203,300 |
| 10.5 | 209,200 | 293,300 | 210,000 |
| 11.0 | 202,800 | 303,300 | 206,700 |
| 11.5 | 207,600 | 306,700 | 200,000 |
| 12.0 | 207,600 | 276,700 | 200,000 |
| 12.5 | 207,600 | 280,000 | 206,700 |
| 13.0 | 206,400 | 310,000 | 200,000 |
| 13.5 | 205,600 | 296,700 | 196,700 |
| 14.0 | 205,600 | 276,700 | 203,300 |
| 14.5 | 205,200 | 293,300 | 196,700 |
| 15.0 | 205,200 | 293,300 | 193,300 |
| 15.5 | 203,600 | 266,700 | 200,000 |
| 16.0 | 202,400 | 290,000 | 196,700 |
| 16.5 | 203,600 | 290,000 | 190,000 |
| 17.0 | 203,600 | 256,700 | 193,300 |
| 17.5 | 202,800 | 266,700 | 200,000 |
| 18.0 | 202,800 | 300,000 | 190,000 |
| 18.5 | 202,000 | 283,300 | 190,000 |
| 19.0 | 202,000 | 256,700 | 193,300 |
| 19.5 | 201,600 | 283,300 | 186,700 |
| 20.0 | 201,200 | 283,300 | 183,300 |
| 20.5 | 200,800 | 260,000 | 190,000 |
| 21.0 | 200,400 | 270,000 | 190,000 |
| 21.5 | 200,000 | 280,000 | 183,300 |
| 22.0 | 199,600 | 270,000 | 183,300 |
| 22.5 | 199,600 | 256,700 | 190,000 |
| 23.0 | 199,200 | 286,700 | 183,300 |
| 23.5 | 198,800 | 273,300 | 180,000 |
| 24.0 | 198,400 | 256,700 | 186,700 |
| 24.5 | 198,000 | 276,700 | 180,000 |
| 25.0 | 197,600 | 276,700 | 180,000 |
| 25.5 | 197,100 | 256,700 | 183,300 |
| 26.0 | 196,800 | 240,000 | 153,300 |
| 26.5 | 196,400 | 276,700 | 176,700 |

TABLE 2-continued

| | Viscosity (cP) | | |
|---|---|---|---|
| Time (min) | Control Chocolate Almond Butter | Supplier 1 - 3% Konjac/2% water in Chocolate Almond Butter | Supplier 2 - 3% Konjac/2% water in Chocolate Almond Butter |
| 27.0 | 195,900 | 270,000 | 180,000 |
| 27.5 | 195,500 | 260,000 | 183,300 |
| 28.0 | 195,200 | 280,000 | 176,700 |
| 28.5 | 194,700 | 263,300 | 180,000 |
| 29.0 | 194,300 | 243,300 | 183,300 |
| 29.5 | 192,800 | 263,300 | 176,700 |
| 30.0 | 192,800 | 260,000 | 176,700 |

Figure 3:
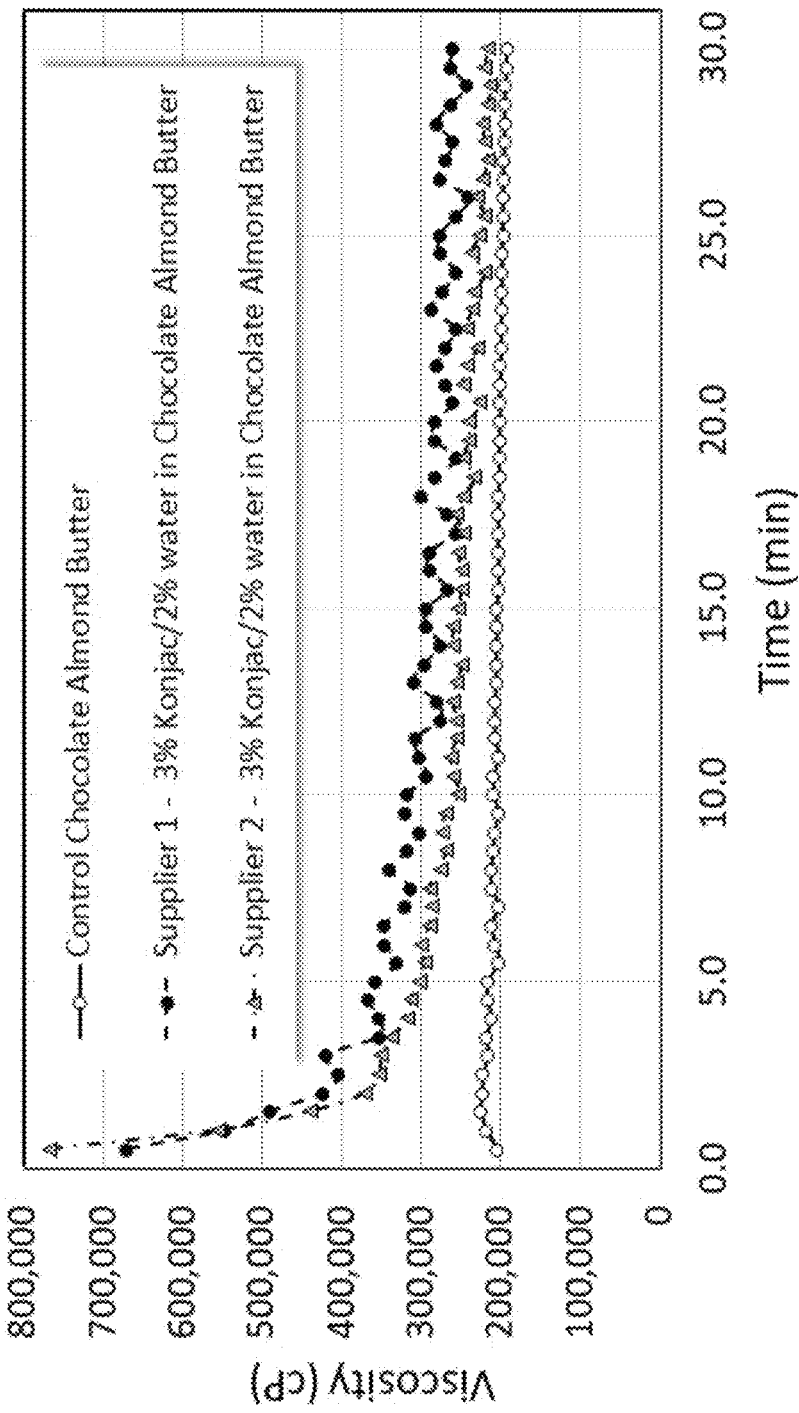
FIG. 3 is a graph that shows the viscometric properties of two different konjac fibers when mixed with a chocolate almond butter and following a 24-hour tempering at room temperature.

FIG. 3 is a graph that shows the viscometric properties of two different sources of konjac fiber (konjac glucomannan) when mixed with a chocolate almond butter and following a 24-hour tempering at room temperature in which oil separation is prevented, reduced, or significantly delayed due to the presence of the konjac fiber and water. The viscosity of control chocolate almond butter without konjac fiber is shown for comparison. The konjac fiber was blended to homogeneity into the chocolate nut butter followed by addition of moisture, vanilla and flavors with low shear mixing. The solution was tempered at room temperature for 24 hours. The viscosity was monitored over a 30-minute time period using a Brookfield® model DV3T-HAT-JO, firmware v. 1.3.4-9, TK v. 1.0, spindle v. 1.0 equipped with an HA-06 spindle run at a speed of 0.60 rpm. Viscosity of the control chocolate nut butter was measured with the same instrument using an HA-03 spindle run at a speed of 0.5 rpm.

Table 3 shows the viscosity curve data in centipoise (cP) of the graph shown in FIG. 3.

TABLE 3

| | Viscosity (cP) | | |
|---|---|---|---|
| Time (min) | Control Chocolate Almond Butter | Supplier 1 - 3% Konjac/2% water in Chocolate Almond Butter | Supplier 2 - 3% Konjac/2% water in Chocolate Almond Butter |
| 0.5 | 204,800 | 670,000 | 766,700 |
| 1.0 | 218,400 | 546,700 | 556,700 |
| 1.5 | 225,600 | 490,000 | 440,000 |
| 2.0 | 224,000 | 423,300 | 370,000 |
| 2.5 | 222,800 | 403,300 | 353,300 |
| 3.0 | 216,400 | 420,000 | 350,000 |
| 3.5 | 218,000 | 353,300 | 336,700 |
| 4.0 | 212,000 | 353,300 | 316,700 |
| 4.5 | 217,200 | 366,700 | 313,300 |
| 5.0 | 216,400 | 356,700 | 303,300 |
| 5.5 | 202,800 | 330,000 | 296,700 |
| 6.0 | 206,800 | 346,700 | 300,000 |
| 6.5 | 212,400 | 346,700 | 290,000 |
| 7.0 | 202,800 | 320,000 | 286,700 |
| 7.5 | 212,000 | 313,300 | 290,000 |
| 8.0 | 212,000 | 340,000 | 276,700 |
| 8.5 | 210,400 | 316,700 | 270,000 |
| 9.0 | 208,000 | 303,300 | 273,300 |
| 9.5 | 203,600 | 320,000 | 270,000 |
| 10.0 | 208,800 | 316,700 | 253,300 |
| 10.5 | 209,200 | 293,300 | 260,000 |
| 11.0 | 202,800 | 303,300 | 263,300 |
| 11.5 | 207,600 | 306,700 | 256,700 |
| 12.0 | 207,600 | 276,700 | 256,700 |
| 12.5 | 207,600 | 280,000 | 260,000 |
| 13.0 | 206,400 | 310,000 | 256,700 |
| 13.5 | 205,600 | 296,700 | 250,000 |
| 14.0 | 205,600 | 276,700 | 260,000 |
| 14.5 | 205,200 | 293,300 | 260,000 |
| 15.0 | 205,200 | 293,300 | 253,300 |

TABLE 3-continued

| | Viscosity (cP) | | |
|---|---|---|---|
| Time (min) | Control Chocolate Almond Butter | Supplier 1 - 3% Konjac/2% water in Chocolate Almond Butter | Supplier 2 - 3% Konjac/2% water in Chocolate Almond Butter |
| 15.5 | 203,600 | 266,700 | 250,000 |
| 16.0 | 202,400 | 290,000 | 250,000 |
| 16.5 | 203,600 | 290,000 | 253,300 |
| 17.0 | 203,600 | 256,700 | 246,700 |
| 17.5 | 202,800 | 266,700 | 256,700 |
| 18.0 | 202,800 | 300,000 | 246,700 |
| 18.5 | 202,000 | 283,300 | 233,300 |
| 19.0 | 202,000 | 256,700 | 246,700 |
| 19.5 | 201,600 | 283,300 | 240,000 |
| 20.0 | 201,200 | 283,300 | 240,000 |
| 20.5 | 200,800 | 260,000 | 226,700 |
| 21.0 | 200,400 | 270,000 | 246,700 |
| 21.5 | 200,000 | 280,000 | 243,300 |
| 22.0 | 199,600 | 270,000 | 230,000 |
| 22.5 | 199,600 | 256,700 | 243,300 |
| 23.0 | 199,200 | 286,700 | 236,700 |
| 23.5 | 198,800 | 273,300 | 233,300 |
| 24.0 | 198,400 | 256,700 | 220,000 |
| 24.5 | 198,000 | 276,700 | 236,700 |
| 25.0 | 197,600 | 276,700 | 226,700 |
| 25.5 | 197,100 | 256,700 | 220,000 |
| 26.0 | 196,800 | 240,000 | 230,000 |
| 26.5 | 196,400 | 276,700 | 223,300 |
| 27.0 | 195,900 | 270,000 | 216,700 |
| 27.5 | 195,500 | 260,000 | 220,000 |
| 28.0 | 195,200 | 280,000 | 223,300 |
| 28.5 | 194,700 | 263,300 | 216,700 |
| 29.0 | 194,300 | 243,300 | 213,300 |
| 29.5 | 192,800 | 263,300 | 220,000 |
| 30.0 | 192,800 | 260,000 | 216,700 |

As shown in FIGS. 2 and 3, for some konjac fibers, full equivalent functionality does not develop until a tempering of the mixture at controlled temperature. In FIG. 2, a control chocolate almond butter comprised of 66% w/w ground almonds, 8% w/w safflower oil, 8% w/w cocoa powder, 13% w/w sugar, 3% w/w vanilla and 0.5% w/w salt was compared to the same composition plus 3% w/w konjac fiber from two different suppliers and 2% w/w water wherein the ground almonds have been reduced in amount directly proportion to the added konjac fiber plus water. The chocolate almond butter using the konjac fiber from Supplier 2 does not attain the same viscosity as the chocolate almond butter using konjac fiber from Supplier 1 even though both ingredients had similar specifications. In FIG. 3, the same compositions shown in FIG. 2 were allowed to temper at room temperature for 24 h at room temperature. The chocolate almond butter using konjac fiber from Supplier 2 now has a more similar viscosity to that of the chocolate almond butter from Supplier 1. This demonstrates that a tempering of a product using konjac fiber as disclosed herein may be necessary in some cases to achieve the desired effects depending on the source of the Konjac fiber used.

Compositions and Methods

In various embodiments, the compositions of the present disclosure may comprise nut butter, konjac, and water. In other embodiments, the compositions may also comprise flavorings, one or more secondary fats, cocoa powder, vitamins, and salt. The water added may be through flavorings, such as vanilla.

In various embodiments, the methods of producing the compositions may comprise mixing, low shear mixing, and tempering. Preferably, the water should be either blended into the nut butter mixture before the addition of the konjac fiber or after the addition of the konjac fiber to the nut butter mixture. Mixing the water with the Konjac Fiber before addition to the nut butter mixture, or at the same time, may cause a gelation of the Konjac Fiber, which may not blend well with the nut butter mixture and does not form the proper and desirable complex.

Once the konjac fiber has been added to the nut butter mixture it is important that mixing be performed under low-shear conditions that do not reduce the particle size of the total mixture or the konjac fiber itself. Shear resulting in particle size reduction will reduce the final viscosity and the efficacy of the konjac fiber. Low shear handling of the product after mixing, and up to and including packaging, is necessary for maintenance of the oil stabilizing properties of the invention.

Table 4 shows one composition and method for creating one embodiment of a chocolate-almond nut butter with a preferred viscosity. Table 4 shows one possible order of mixing the ingredients. Table 4 shows a preferred weight percent amount and a preferred range.

TABLE 4

| Ingredient or Operation | % wt/wt (wt %) | % wt/wt range (wt % range) |
|---|---|---|
| 1. Cocoa powder/almond butter mixture | 72.0 | 1.0-99.8 |
| 2. Cacao Butter | 2.0 | Zero-25.0 |
| 3. Low-shear mix to homogeneity | — | — |
| 4. Sugar | 12.0 | Zero-50.0 |
| 5. Low-shear mix to homogeneity | — | — |
| 6. Konjac fiber | 3.0 | 0.1-70.0 |
| 7. Low-shear mix to homogeneity | — | — |
| 8. Salt | .25 | Zero-1.5 |
| 9. Vanilla and other flavorings (note: 53.3% of added vanilla and flavorings = water added [i.e. 2%]) | 3.75 | 0.1-25 |
| 10. Safflower Oil | 7.0 | Zero-25.0 |
| 11. Low-shear mix to homogeneity | — | — |

Table 4 shows that although it may be preferred, the composition need not include either of the two secondary fats (Safflower Oil and Cacao Butter) or any ingredient that has a lower range of Zero. The composition of Table 4 may also comprise various nutrients, such as docosahexaenoic acid (DHA) and vitamin E The composition of Table 4 had 0% oil separation after 30 days of storage at 22 C (typical room temperature). The composition of Table 4 has a viscosity range of 480,000-520,000 cP. Higher viscosities are preferred because a more viscous solution further prevents and/or reduces oil separation.

Table 5 shows a composition and method for creating another embodiment of a chocolate-almond nut butter with an elevated, as preferred, viscosity. Table 5 shows one possible order of mixing the ingredients.

TABLE 5

| Ingredient or Operation | % wt/wt (wt %) | % wt/wt range (wt % range) |
|---|---|---|
| 1. Cocoa powder/almond butter mixture | 95.0 | 5.0-99.8 |

TABLE 5-continued

| Ingredient or Operation | % wt/wt (wt %) | % wt/wt range (wt % range) |
|---|---|---|
| 2. Konjac fiber | 3.0 | 0.1-70.0 |
| 3. Low-shear mix to homogeneity | — | — |
| 4. Water | 2.0 | 0.1-25.0 |
| 11. Low-shear mix to homogeneity | — | — |

The composition of Table 5 has a viscosity range of 150,000-250,000 cP. Although the composition of Table 5 has a lower viscosity than the composition of Table 4, this is viscosity is still very high, and higher than the viscosity of the nut butter ingredient by itself.

Table 6 shows a composition and method for creating one embodiment of an almond nut butter with a preferred viscosity. The composition of Table 6 may also comprise various nutrients, such as DHA and vitamin E.

TABLE 6

| Ingredient or Operation | % wt/wt (wt %) | % wt/wt range (wt % range) |
|---|---|---|
| 1. Almond butter | 83.12 | 1.0-99.8 |
| 2. Konjac fiber | 6.0 | 0.1-70.0 |
| 3. Low-shear mix to homogeneity | — | — |
| 4. Water (includes 2% from vanilla) | 5.0 | 0.1-25.0 |
| 5. Vanilla (water subtracted) | 5.5 | Zero-25.0 |
| 6. Salt | 0.375 | Zero-1.5 |
| 7. Low-shear mix to homogeneity | — | — |

The composition of Table 6 has a viscosity range of 130,000-230,000 cP.

Table 7 shows a composition and method for creating one embodiment of an almond nut butter with a preferred viscosity. The composition of Table 7 may also comprise various nutrients, such as docosahexaenoic acid (DHA) and vitamin E.

TABLE 7

| Ingredient or Operation | % wt/wt (wt %) | % wt/wt range (wt % range) |
|---|---|---|
| 1. Almond butter | 80.62 | 1.0-99.8 |
| 2. Cacao Butter (melted) | 2.5 | Zero-25 |
| 3. Low-shear mix to homogeneity | — | — |
| 4. Konjac fiber | 6.0 | 0.1-70.0 |
| 5. Low-shear mix to homogeneity | — | — |
| 6. Water (includes 2% from vanilla) | 5.0 | 0.1-25.0 |
| 7. Vanilla (water subtracted) | 5.5 | Zero-25.0 |
| 8. Salt | 0.375 | Zero-1.5 |
| 9. Low-shear mix to homogeneity | — | — |

The composition of Table 7 has a viscosity range of 220,000-320,000 cP.

Table 8 shows a composition and method for creating one embodiment of a macadamia nut butter with a preferred viscosity.

TABLE 8

| Ingredient or Operation | % wt/wt (wt %) | % wt/wt range (wt % range) |
|---|---|---|
| 1. Almond butter | 84.82 | 1.0-99.8 |
| 2. Konjac fiber | 9.0 | 0.1-70.0 |
| 3. Low-shear mix to homogeneity | — | — |
| 4. Water (includes 0.35% from vanilla) | 5.35 | 0.1-25.0 |
| 5. Vanilla (water subtracted) | 0.45 | Zero-25.0 |
| 6. Salt | 0.375 | Zero-1.5 |
| 7. Low-shear mix to homogeneity | — | — |

The composition of Table 8 has a viscosity range of 90,000-200,000 cP.

Table 9 shows a composition and method for creating one embodiment of a macadamia nut butter with a preferred viscosity.

TABLE 9

| Ingredient or Operation | % wt/wt (wt %) | % wt/wt range (wt % range) |
|---|---|---|
| 1. Almond butter | 84.82 | 1.0-99.8 |
| 2. Cacao Butter (melted) | 2.0 | Zero-25 |
| 3. Low-shear mix to homogeneity | — | — |
| 4. Konjac fiber | 7.0 | 0.1-70.0 |
| 5. Low-shear mix to homogeneity | — | — |
| 6. Water (includes 0.35% from vanilla) | 5.35 | 0.1-25.0 |
| 7. Vanilla (water subtracted) | 0.45 | Zero-25.0 |
| 8. Salt | 0.375 | Zero-1.5 |
| 9. Low-shear mix to homogeneity | — | — |

The composition of Table 9 has a viscosity range of 180,000-280,000 cP.

Figure 4:
FIG. 4 is an illustration that compares one embodiment of the composition of the present disclosure to a control after being stored for thirty days.

FIG. 4 is an illustration that compares one embodiment of the composition of the present disclosure to a control after being stored for thirty days. As shown in FIG. 4, the control 101 has experienced a 8.7% (v/v) oil separation after being stored at 22 C for thirty days. The control 101 is a mixture that comprises 66% w/w ground almonds, 8% w/w safflower oil, 8% w/w cocoa powder, 13% w/w sugar, 3% w/w vanilla and 0.5% w/w salt.

FIG. 4 also shows that the nut butter mixture made in accordance with the composition and method provided in Table 4 hereinabove, TEST—E 103, which is comprised of the same ingredients and proportions as control 101 except with ground almonds reduced in amount directly proportion to the 3% w/w konjac fiber, 2% w/w water and 2% w/w cacao butter added, has zero oil separation.

Figure 5:
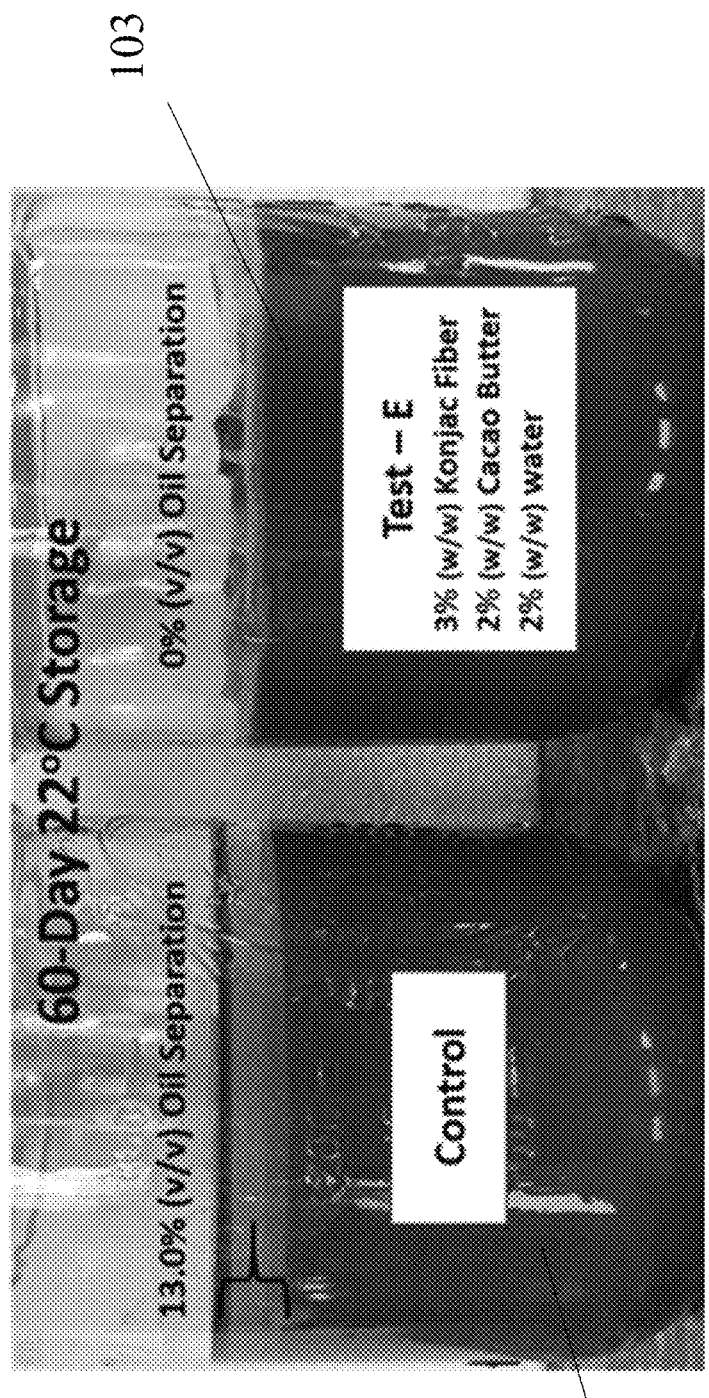
FIG. 5 is an illustration that compares one embodiment of the composition of the present disclosure to a control after being stored for sixty days.

FIG. 5 is an illustration that compares one embodiment of the composition of the present disclosure to a control after being stored for sixty days. As shown in FIG. 5, the control 101 has now experienced a 13% (v/v) oil separation after being stored at 22 C for sixty days. FIG. 5 also shows that TEST—E 103, is still at zero oil separation. Thus, the composition has prevented oil separation and/or significantly slowed the separation.

Figure 6:
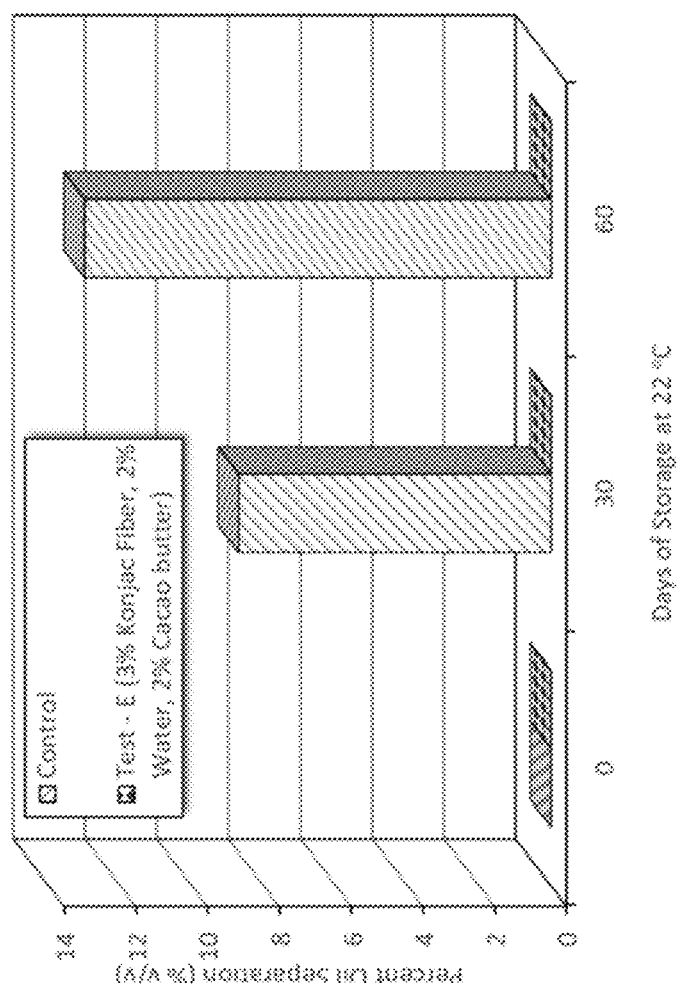
FIG. 6 is a graph that shows the relative oil separation experienced by a control nut butter formulation and a formulation in accordance with the present disclosure.

FIG. 6 is a graph that shows the relative oil separation experienced by a control nut butter formulation and a formulation in accordance with the present disclosure. FIG. 6 specifically graphs the oil separation experienced by the control mixture as compared to the zero % separation of TEST E 103 after thirty days (FIG. 4) and after sixty days (FIG. 5).

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. The disclosed embodiments capable of modifications in various obvious aspects, all without departing from the spirit and scope of the protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope. It is intended that the scope or protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A composition, comprising:
   one or more nut butters;
   konjac; and
   water;
   wherein said konjac, at a 1% (w/w) fully solubilized dispersed solution in water, has a minimum viscosity of 140,000 centipoise (cP); and
   wherein said konjac is blended with said one or more nut butters via low-shear mixing before said water is added.

2. The composition of claim 1, wherein said konjac used is made from a corm of said konjac.

3. The composition of claim 2, wherein a konjac flour is made from said konjac corm.

4. The composition of claim 2, wherein a konjac fiber is made from said konjac corm.

5. The composition of claim 1, wherein said konjac is at least 70% glucomannan.

6. The composition of claim 1, wherein said konjac is at least 95% glucomannan.

7. The composition of claim 1, wherein said composition further comprises one or more secondary fats.

8. The composition of claim 7, wherein at least one of said one or more secondary fats is cacao or cocoa butter.

9. The composition of claim 7, wherein said composition further comprises at least one flavoring selected from the flavorings consisting of:
   salt, vanilla, cocoa powder, and combinations thereof.

10. The composition of claim 1, wherein said composition further comprises at least one flavoring selected from the flavorings consisting of:
    salt, vanilla, cocoa powder, and combinations thereof.

11. The composition of claim 1, wherein said composition is blended using low-shear mixing.

12. A composition, comprising:
    one or more nut butters in a range of approximately 1.0-99.8% by weight;
    a konjac fiber in a range of approximately 0.1-70.0% by weight; and
    water in a range of approximately 0.1-25.0% by weight;
    wherein said konjac fiber, at a 1% (w/w) fully solubilized dispersed solution in water, has a minimum viscosity of 140,000 centipoise (cP); and
    wherein said konjac fiber is blended with said one or more nut butters via low-shear mixing before said water is added.

13. The composition of claim 12, wherein said konjac fiber is at least 70% glucomannan.

14. The composition of claim 12, wherein said konjac fiber is at least 95% glucomannan.

15. The composition of claim 12, wherein said composition further comprises one or more secondary fats.

16. The composition of claim 15, wherein said one or more secondary fats is cocoa butter, in an amount up to approximately 25.0% by weight.

17. The composition of claim 15, wherein said composition further comprises at least one flavoring selected from the flavorings consisting of:
    salt, vanilla, cocoa powder, and combinations thereof.

18. The composition of claim 12, wherein said composition further comprises at least one flavoring selected from the flavorings consisting of:
    salt, vanilla, cocoa powder, and combinations thereof.

19. A composition, comprising:
    one or more nut butters in a range of approximately 70.0-95.0% by weight;
    a konjac fiber in a range of approximately 1.0-10.0% by weight; and
    water in a range of approximately 1.0-10.0% by weight;
    wherein said konjac fiber, at a 1% (w/w) fully solubilized dispersed solution in water, has a minimum viscosity of 140,000 centipoise (cP); and
    wherein said konjac fiber is blended with said one or more nut butters via low-shear mixing before said water is added.

20. The composition of claim 19, further comprising cocoa butter in a range of approximately 1.0 to 10.0% by weight.

* * * * *